United States Patent
Finnerty et al.

(10) Patent No.: US 11,462,751 B2
(45) Date of Patent: Oct. 4, 2022

(54) THERMALLY INSULATED HOUSING FOR A HEAT-PRODUCING, HEAT-RADIATING DEVICE

(71) Applicant: WATT FUEL CELL CORP., Mount Pleasant, PA (US)

(72) Inventors: Caine Finnerty, Mount Pleasant, PA (US); Paul Dewald, Scottdale, PA (US); Mathew Isenberg, North Canton, OH (US)

(73) Assignee: WATT FUEL CELL CORP., Mt. Pleasant, PA (US)

( * ) Notice: Subject to any disclaimer, the term of this patent is extended or adjusted under 35 U.S.C. 154(b) by 0 days.

(21) Appl. No.: 17/267,074

(22) PCT Filed: Aug. 28, 2019

(86) PCT No.: PCT/US2019/048469
§ 371 (c)(1),
(2) Date: Feb. 9, 2021

(87) PCT Pub. No.: WO2020/047036
PCT Pub. Date: Mar. 5, 2020

(65) Prior Publication Data
US 2021/0313597 A1    Oct. 7, 2021

Related U.S. Application Data

(60) Provisional application No. 62/724,287, filed on Aug. 29, 2018.

(51) Int. Cl.
*H01M 8/04* (2016.01)
*H01M 8/04007* (2016.01)
*H01M 8/2457* (2016.01)
*H01M 8/04701* (2016.01)
*H01M 8/0612* (2016.01)
*H01M 8/2425* (2016.01)
(Continued)

(52) U.S. Cl.
CPC ... *H01M 8/04052* (2013.01); *H01M 8/04738* (2013.01); *H01M 8/0631* (2013.01); *H01M 8/249* (2013.01); *H01M 8/2425* (2013.01); *H01M 8/2457* (2016.02); *H01M 8/2475* (2013.01); *H01M 2008/1293* (2013.01)

(58) Field of Classification Search
CPC .......... H01M 8/04052; H01M 8/2457; H01M 8/04738; H01M 8/0631; H01M 8/2425
See application file for complete search history.

(56) References Cited

U.S. PATENT DOCUMENTS 4,640,875 A * 2/1987 Makiel ................ H01M 8/243
429/479
9,624,104 B2 4/2017 Finnerty et al.
(Continued)

OTHER PUBLICATIONS

International Search Report and Written Opinion from PCT/US19/048469 dated Nov. 20, 2019.

*Primary Examiner* — Olatunji A Godo
(74) *Attorney, Agent, or Firm* — Dilworth & Barrese, LLP.; Michael J. Musella, Esq.

(57) ABSTRACT

A thermally insulated housing for a heat-producing, heat-radiating device such as an integrated CPOX reformer and SOFC stack includes an assembly of thermal insulation sections that presents an indirect, or tortuous, path that inhibits the flow of IR vectors to the walls of the housing.

20 Claims, 13 Drawing Sheets

(51) Int. Cl.
    *H01M 8/2475*     (2016.01)
    *H01M 8/249*     (2016.01)
    *H01M 8/12*     (2016.01)

(56) References Cited

U.S. PATENT DOCUMENTS

| | | |
|---|---|---|
| 9,627,699 B2 | 4/2017 | Finnerty et al. |
| 9,627,700 B2 | 4/2017 | Finnerty et al. |
| 9,627,701 B2 | 4/2017 | Finnerty et al. |
| 2006/0261304 A1 | 11/2006 | Muthukumaran et al. |
| 2006/0263665 A1 | 11/2006 | Schaevitz et al. |
| 2014/0170516 A1 | 6/2014 | Sridhar et al. |
| 2016/0260990 A1 | 9/2016 | Finnerty et al. |
| 2017/0062852 A1 | 3/2017 | Finnerty et al. |
| 2018/0053953 A1 | 2/2018 | Eickhoff et al. |

\* cited by examiner

THERMALLY INSULATED HOUSING FOR A HEAT-PRODUCING, HEAT-RADIATING DEVICE

This application claims priority to U.S. Provisional Application No. 62/724,287 filed on Aug. 29, 2018, the entire contents of which is incorporated herein by reference.

BACKGROUND OF THE INVENTION

The present teachings relate to thermally insulated housings, or enclosures, for heat-producing, heat-radiating devices, in particular, integrated systems of catalytic partial oxidation (CPOX) reformers for the production of hydrogen-rich reformate and solid oxide fuel cell (SOFC) stacks and combined afterburner units for the electrochemical conversion of such reformate to electricity and by-product water vapor(steam) in a fuel cell which is another type of heat-producing, heat-radiating device.

The conversion of a gaseous or liquid reformable fuel to a hydrogen-rich carbon monoxide-containing gas mixture, a product commonly referred to as "synthesis gas" or "syngas," can be carried out in accordance with any of such conventional or otherwise known fuel reforming operations as steam reforming, dry reforming, autothermal reforming, and catalytic partial oxidation (CPOX) reforming. Each of these fuel reforming processes has its own distinctive chemistry and requirements and each is marked by characteristic advantages and disadvantages relative to the others.

The development of improved fuel reformers, fuel reformer components, and reforming processes continues to be the focus of considerable research due to the potential of fuel cells, i.e., devices for the electrochemical conversion of electrochemically oxidizable fuels such as hydrogen, mixtures of hydrogen and carbon monoxide, and the like, to electricity, to play a greatly expanded role for general applications including main power units (MPUs) and auxiliary power units (APUs). Fuel cells also can be used for specialized applications, for example, as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) are widely believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as convertors of such fuels to electricity, and the integration of fuel reformers and fuel cells into more compact, reliable and efficient devices for the production of electrical energy.

CPOX reforming, or simply CPOX, has attracted particular attention as a way of supplying hydrogen-rich reformate to fuel cell stacks, for example, those having nominal power ratings of anywhere from 100 watts to 100 kilowatts, and all power ratings in between. Among the advantages of CPOX reforming is that the reaction is exothermic in contrast to steam reforming and dry reforming which are endothermic reactions that require an external source of heat.

Furthermore, CPOX reactions are generally faster than other reforming reactions which allows for the construction of relatively small reformers capable of fast start-up and rapid response to changes in load. CPOX reformers also tend to be simpler in design than reformers that require the handling of water and steam, for example, steam reformers and autothermal reformers, which require storage units for water, heating units for the production of steam, burner or combustion units for supplying heat to drive endothermic reforming reactions, and the like, and their associated fluid routing and operation-monitoring and control devices.

It is an essential requirement of known and conventional reformers that their heat-producing and heat radiating components be provided with effective thermal insulation, either to conserve and recover waste heat for use in such reformer operations as preheating oxygen-containing gas for supporting oxidation (typically provided as atmospheric air at ambient temperature and pressure), vaporizing a liquid fuel such as diesel in order to provide a suitably preheated gaseous air and gaseous CPOX reaction mixture, and recovering waste heat from the afterburner unit of a fuel cell stack to which the fuel cell is attached in order to utilize such heat for helping to meet domestic hot water needs. And of course, as a practical matter it is necessary to provide thermal insulation for reformers, fuel cells and integrated reformer and fuel cell systems such as those described in commonly owned U.S. Pat. Nos. 9,624,104; 9,627,700; 9,627,699 and 9,627,701, the entire contents of which are incorporated by reference herein, in order to prevent such loss of heat that would otherwise significantly reduce the thermal operating efficiency of such devices. Reformers, their attendant fuel cell and afterburner units as well as other heat-producing, heat-radiating devices are typically installed within an enclosure or housing. It is an essential requirement of such enclosure or housing that it be provided with thermal insulation so that the external surfaces of the housing will be relatively cool to the touch.

SUMMARY OF THE INVENTION

In accordance with the present invention there is provided a thermally insulated housing for a heat producing, heat-radiating device which comprises: a thermally insulated first housing possessing conjoined side, top and bottom panels such panels having opposed internal and exposed external sides, the panels being dimensioned and configured to completely enclose a heat-producing, heat-radiating device, the interior sides of the first housing panels having adherently attached thereto at least one refractory thermal insulation assembly or combination of such assemblies, each such thermal insulation assembly or combination of thermal insulation assemblies defining at least one structure made up of superimposed sections of pre-dimensioned and preconfigured refractory thermal insulation with a major side of each thermal insulation assembly or combination of such assemblies being adherently attached to an interior surface of each first housing side panel and a major side of each thermal insulation assembly or combination of such assemblies facing toward, and spatially separated from, the enclosed heat-producing, heat-radiating device, the dimensions, configuration and maximum service temperature of each thermal insulation assembly or combination of such assemblies being such as to substantially completely and continuously line the internal surfaces of the side panels of the first housing, the thermal insulation or combination thereof thereby inhibiting thermal losses from the enclosed heat-producing, heat-radiating device to a predetermined extent, each thermal insulation assembly or combination thereof excluding a direct path for the flow of IR radiation from the heat-producing, heat-radiating device thereby inhibiting thermal losses from the heat-producing, heat-radiating device to a predetermined extent while maintaining a maximum predetermined surface temperature on the external surface of each first housing panel.

The insulation assemblies of the foregoing first housing effectively address several technical problems to which known insulated housings may be subject, namely, the relatively rapid loss of heat from their enclosed heat-producing, heat-radiating devices due to their insulation structures presenting one or more straight paths allowing for the direct and unimpeded flow of IR radiation vectors. The second technical problem effectively solved by the unique arrangement of thermally insulating assemblies characteristic of the thermal insulation assemblies herein resides in their ability to maintain a relatively cool-to-the touch condition on all external surfaces of an optional second or outer housing, such permitting safe handling, including for example, field transport (assuming, of course, the portability of the enclosed heat-producing, heat-radiating device) during and even after lengthy periods of continuous operation. Since the thermally insulating assembly and combination of such assemblies herein lining the first housing readily allow for the use of only that precise amount of thermal insulation material that is needed to provide insulation capacity meeting predetermined specifications for a given combination of first, thermally insulated housing and enclosed heat-producing, heat-radiating, i.e., IR-radiating device, these thermal insulation assemblies may advantageously be produced in a cost-effective manner.

The unique interlocking design of the individual thermal insulation pieces within the thermal insulation assemblies solves the problem for requiring additional mechanical fastening for retention of the thermal insulation assembly, both to itself and the interior panels of the first housing. Having a self-supporting structure and removing the requirement of mechanical fastening reduces overall weight and additional cost, while improving the portability of the device.

In those embodiments of the thermally insulated housing herein wherein the heat-producing, heat-radiating device is an integrated multi-tubular gaseous fuel partial oxidation (CPOX) reformer and multi-tubular solid oxide fuel cell (SOFC) and afterburner system ("the thermally insulated system"), such system includes an exhaust cowl housing for redirecting hot afterburner exhaust gas in such manner as to reduce or mitigate a Bernoulli effect that as, explained hereinafter, will otherwise result from internal gas flow biases that arise within the thermally insulated system in the absence of the exhaust gas cowl.

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

DETAILED DESCRIPTION OF THE INVENTION

Figure 1A:
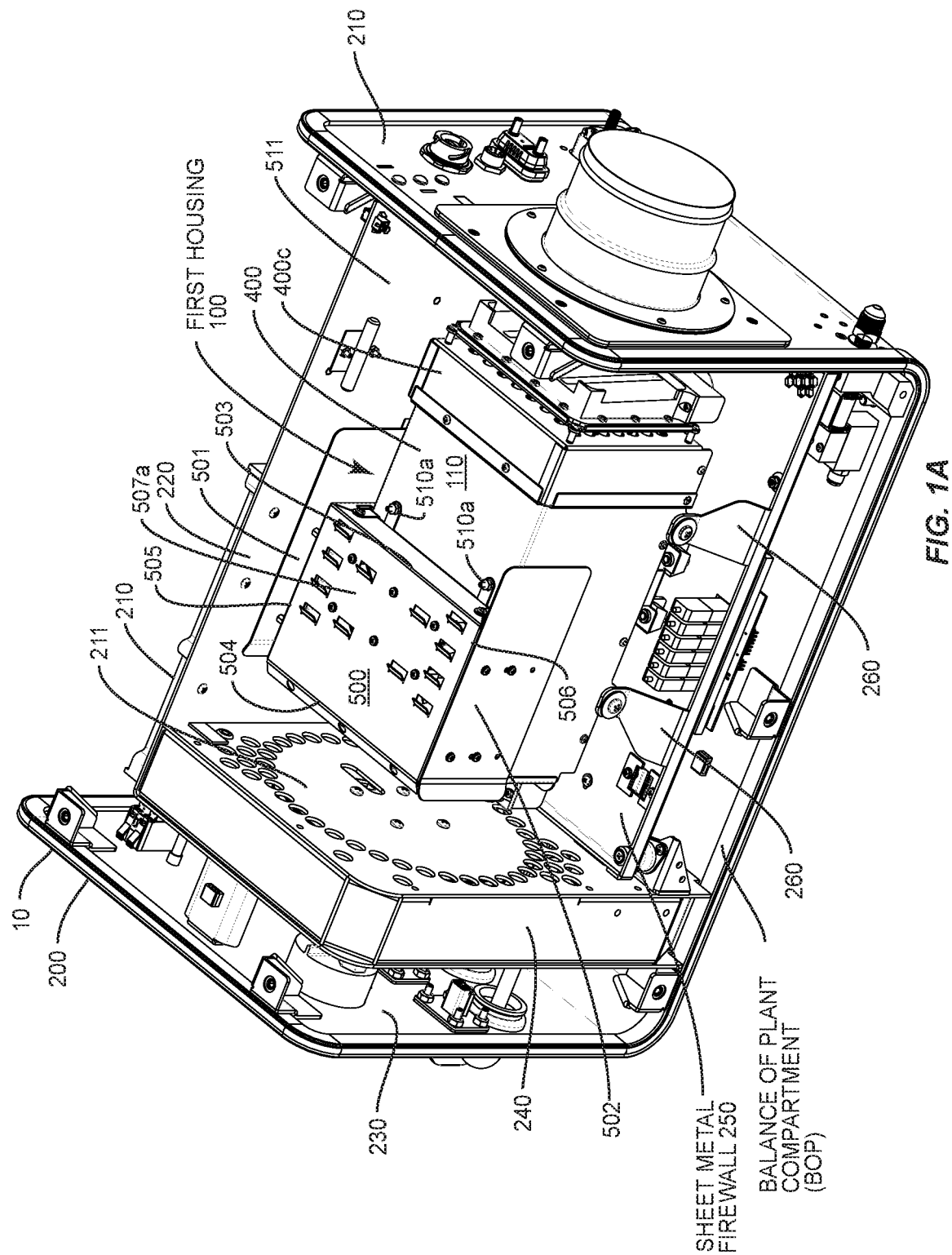
FIG. 1A is a longitudinal perspective view of one embodiment of a thermally insulated first housing and optional second housing in accordance with the present teachings with the top, bottom and side panels of the second housing removed to show substantially fully enclosed thermally insulated first housing and its substantially fully enclosed heat-producing, heat-radiating device, specifically, integrated multi-tubular gaseous fuel partial oxidation (CPOX) reformer and multi-tubular solid oxide fuel cell (SOFC) and afterburner system 400 of FIGS. 7A-7D.
Figure 1B:
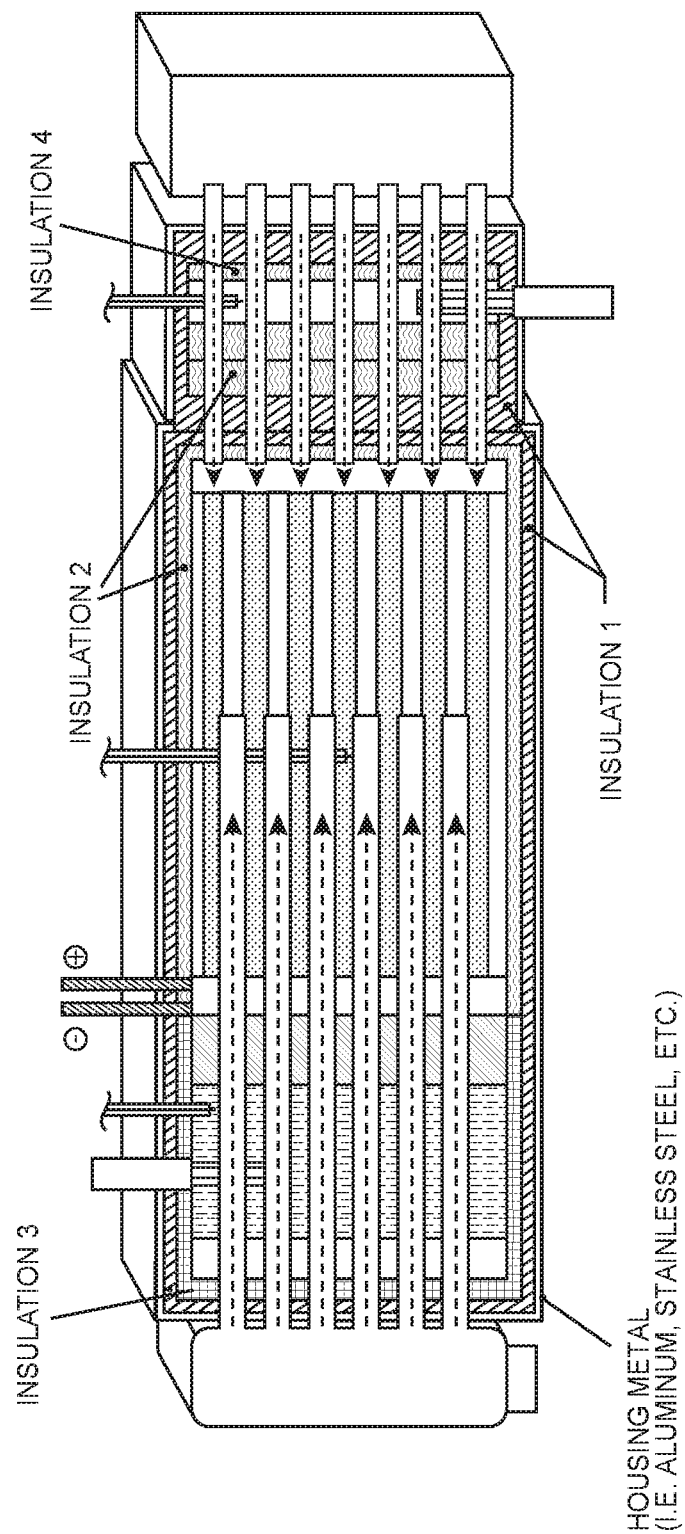
FIG. 1B illustrates in half section longitudinal view a portion of thermally insulated integrated CPOX reformer-SOFC and afterburner system 400 of FIGS. 7A-7D showing the disposition of thermal insulation assemblies of types 200-1 to 200-4 shown in FIG. 2 therein enclosed within the thermally insulated first housing.
Figure 1C:
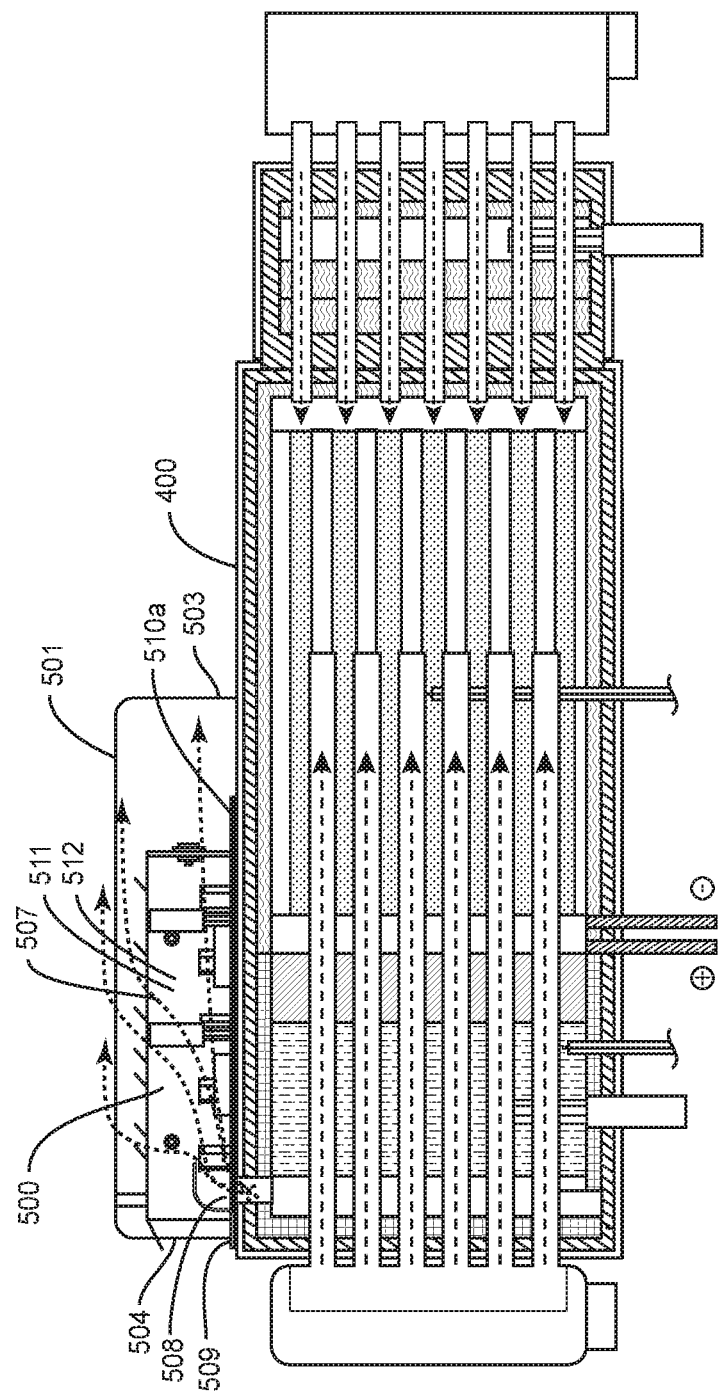
FIG. 1C illustrates in half section longitudinal view integrated CPOX-reformer and afterburner system 400 of FIG. 1A and internal structural details of exhaust gas cowl 500.

It is to be understood that the present teachings herein are not limited to the use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, two or more steps or actions can be conducted simultaneously.

At various places in the present specification, values are disclosed in groups or in ranges. It is specifically intended that a range of values disclosed herein include each and every value within the range and any subrange thereof. For example, a numerical value in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and 40, and any subrange thereof, for example, from 0 to 20, from 10 to 30, from 20 to 40, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of gaseous fuel CPOX reformers of the present teachings illustrated in certain of the accompanying figures.

The term "ceramic," in addition to its art-recognized meaning, shall be understood herein to include glasses, glass-ceramics and cermets (i.e., ceramic-metal composites).

The expressions "thermal insulation sheet" and "thermal insulation board" are used interchangeably herein.

The expression "heat-producing" as used herein shall be understood to be essentially synonymous with "IR-producing" and similarly, the expression "heat-radiating" shall be understood herein to be essentially synonymous with "IR-radiating".

The expression "gas permeable," as it applies to a wall of a CPOX reactor unit herein shall be understood to mean a wall structure that is permeable to gaseous CPOX reaction mixtures and gaseous product reformate including, without limitation, the gaseous reformable fuel component of the gaseous CPOX reaction mixture and the hydrogen component of the product reformate.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

The expression "CPOX reaction" shall be understood to include the reaction(s) that occur during catalytic partial oxidation reforming or conversion of a reformable fuel to a hydrogen-rich reformate.

The expression "gaseous CPOX reaction mixture" refers to a mixture including a gaseous reformable fuel and an oxygen-containing gas, for example, air. As used herein, a gaseous CPOX reaction mixture can comprise, consist essentially of, or consist of, a gaseous reformable fuel and an oxygen-containing gas, for example, air. The CPOX reaction mixture of the present teachings include a liquid reformable fuel in the vapor state, for example, vaporized diesel, or gaseous liquid reformable fuel, again, for example, vaporized diesel.

The expression "open gaseous flow passageway" refers to a conduit or channel for the passage of gas therethrough where a solid, including a porous solid or material, is not present across the entire cross-sectional plane of the conduit or channel, i.e., a conduit or channel free of solids, including porous solids. For example, in the case of a CPOX reactor unit, CPOX catalyst including a porous catalyst such as a monolith cannot be present across the entire internal cross-sectional plane perpendicular to the longitudinal axis of a tubular CPOX reactor unit. Such a structure is distinct from passageways that are packed with a porous catalyst. An open gaseous flow passageway can also be present in a CPOX reactor unit which can be defined as a tube which defines a hollow bore, or a cylindrical substrate defining a hollow bore therethrough along its longitudinal axis. In these exemplary descriptions, the hollow bore can be considered an open gaseous flow passageway. Although an open gaseous flow passageway usually can extend along a longitudinal axis of a CPOX reactor unit, a tortuous conduit or channel is also contemplated by the present teachings and can be capable of having an open gaseous flow passageway provided that the tortuous conduit or channel is free of solids across a cross-sectional plane of the CPOX reactor unit. It should also be understood that the cross-sectional dimension(s) of an open gaseous flow passageway can vary along its longitudinal axis or along the tortuous conduit or channel.

Elevated pressure, for example, in a pressurized tank equipped with a regulator or other type of gas metering unit to reduce the pressure of the fuel to one suitable for its introduction into the reformer. Where the gaseous fuel is stored at atmospheric or modestly elevated pressure, an impeller pump or other gas driving device can be utilized to increase the pressure of the gaseous fuel to a level suitable for the operation of the reformer.

A thermally insulated gaseous fuel CPOX reformer in accordance with the present teachings can include one or more sensor assemblies for monitoring and controlling one or more reformer operations. Examples of sensor assemblies include flow meters, thermocouples, thermistors and resistance temperature detectors. A gaseous fuel CPOX reformer of the present teachings can also include a control system for automating the operations of the reformer in its start-up, steady-state and/or shut-down modes. The control system can include a plurality of sensor assemblies in communication with a controller.

The expressions "hot afterburner combustion gas(es)" and "hot afterburner exhaust gas(es)" and expressions of like import are to be regarded as essentially synonymous.

Figure 7A:
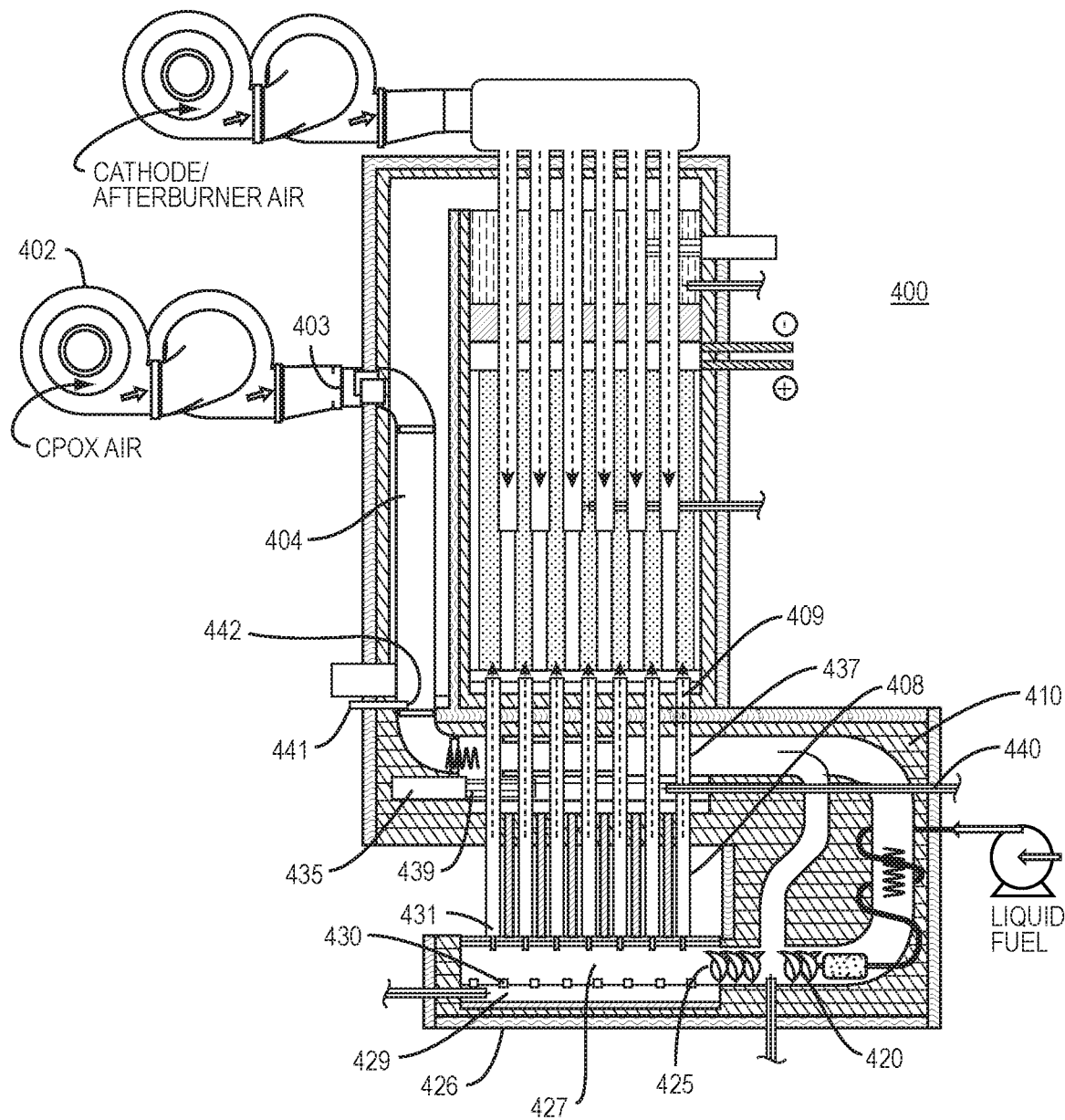
FIG. 7A is a longitudinal cross section view of one embodiment of a heat-producing, heat-radiating device, specifically, a known embodiment (per commonly assigned U.S. Pat. No. 9,627,699, the entire contents of which are incorporated by reference herein) of thermally insulated integrated gaseous fuel multi-tubular CPOX reformer multi-tubular solid oxide fuel cell (SOFC) and combined afterburner system in accordance with the present teachings.
Figure 7B:
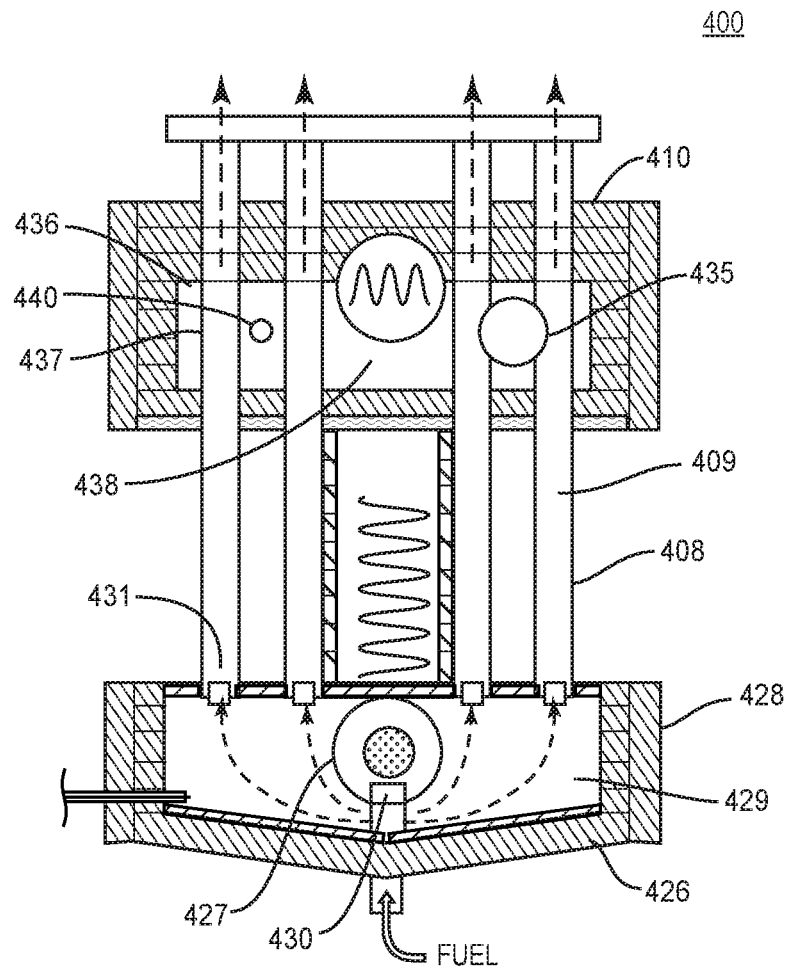
FIG. 7B is a lateral (perpendicular to the longitudinal axis) cross section view of the gaseous fuel CPOX reformer section of the integrated gaseous fuel CPOX reformer-fuel cell system illustrated in FIG. 7A.

Referring now to FIG. 1A, thermally insulated first housing 110 constructed from, e.g., sheet metal, substantially completely encloses a heat-producing, heat-radiating device represented, for example, by integrated, thermally insulated CPOX reformer-SOFC system 400 (which includes the system's afterburner unit 400c) (shown in detail in FIG. 7A with an enlarged portion thereof being shown in FIG. 7B). As previously noted, other heat-producing, heat-radiating devices that can be usefully thermally insulated in accordance with the principles of this invention include internal combustion engines, boilers, ovens, kilns and furnaces, and the like. FIG. 1A also illustrates second, ordinarily non-thermally insulated second housing 200 that fully encloses thermally insulated first housing 100 with its fully enclosed CPOX reformer and SOFC system 400. While there is generally no significant benefit to be gained by providing the interior surfaces of the panels comprising optional second housing 200 with thermal insulation lining as in first thermally insulated housing 100 it will be understood herein that in a particular case such insulation, constructed from one or more thermal insulation assemblies excluding direct flow of IR radiation can be included. In the embodiment of second housing 200 shown in FIG. 1A, second housing is divided into a hot zone 220 separated by system dilution air fan 240 from and a cool zone 230 hot zone 220 is separated from sheet metal firewall 250 defining a balance of plant (BOP) compartment. Hot zone 220 possesses a volume at least sufficient to enclose blower unit 240 and integrated CPOX reformer and SOFC stack . . . with the latter's afterburner unit 400 of FIGS. 1B and 7A-7D.

Thermally insulated first housing 100 with its enclosed integrated CPOX reformer and SOFC system 400 is advantageously elevated above firewall 250 by support legs 260 connected to firewall 250.

Aside from its refractory thermal insulation, the material of construction of thermally insulated first housing 100 and, optionally, second housing 200 is not critical and may be fabricated from any of the conventional or otherwise known materials employed for the construction of housings for machinery, electronic devices, and the like. Sheet-metal, e.g., of steel, titanium, aluminum, their alloys, alloys of other metals, and the like, can advantageously be used as the material of construction of both the first and optional second housings. Polymeric materials capable of maintaining dimensional and mechanical stability even after long periods of exposure to moderately high temperatures. Both housings can be rendered in a variety of geometric configurations, for example, viewed in plan, as a regular polygon such as a square or rectangle (as shown), or with a curvilinear, e.g., a circular, or ovate base, provided the resulting housing possesses sufficient internal volume to substantially completely enclose a particularly dimensioned thermally insulated, heat-producing, heat radiating device. It is generally preferred that the housings not be permanently sealed. It is therefore advantageous that at least one panel of the first and/or second housing be removable or hinged to allow for convenient access to the enclosed heat-producing heat-radiating device to so that any necessary or desirable inspection or servicing of the device can be more readily achieved.

Figure 1E:
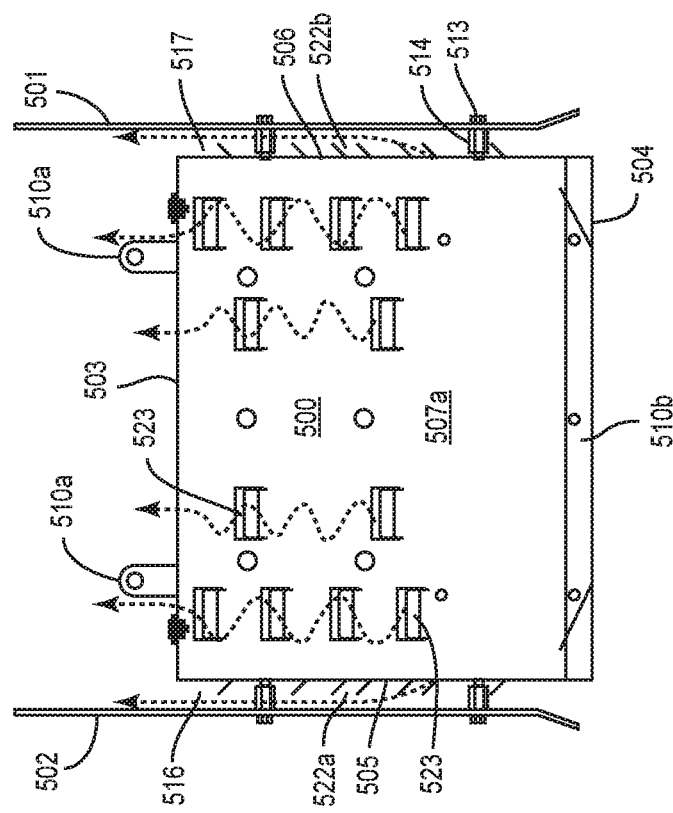
FIG. 1E illustrates in plan view external structural elements for redirecting paths of hot afterburner exhaust gas flows.
Figure 1D:
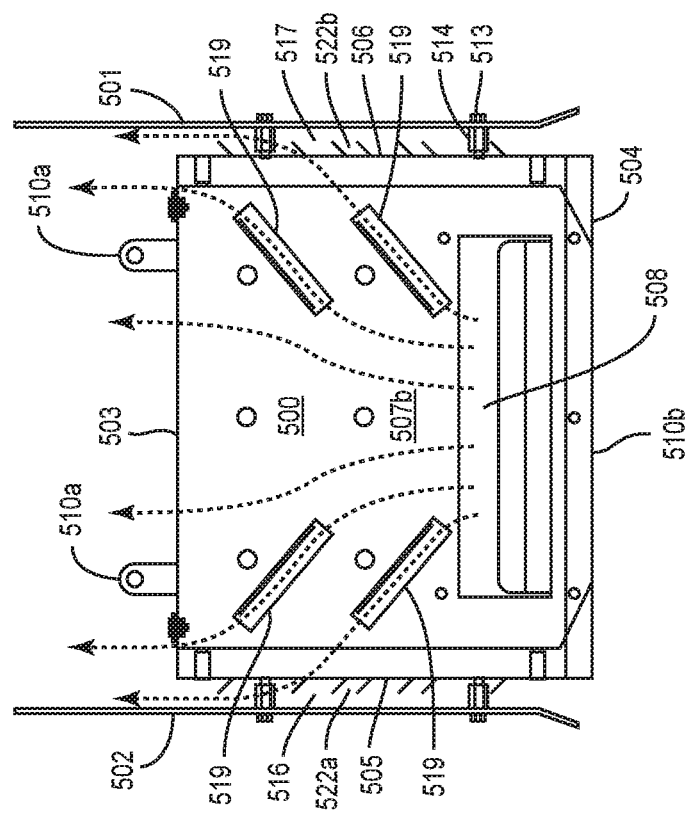
FIG. 1D illustrates in plan view the internal structures of exhaust gas cowl 500 (as shown in FIGS. 1A and 1C) with its upper side removed to reveal the internal structural details of the elements which cooperate to alter the paths of hot afterburner exhaust gas.
Figure 2A:
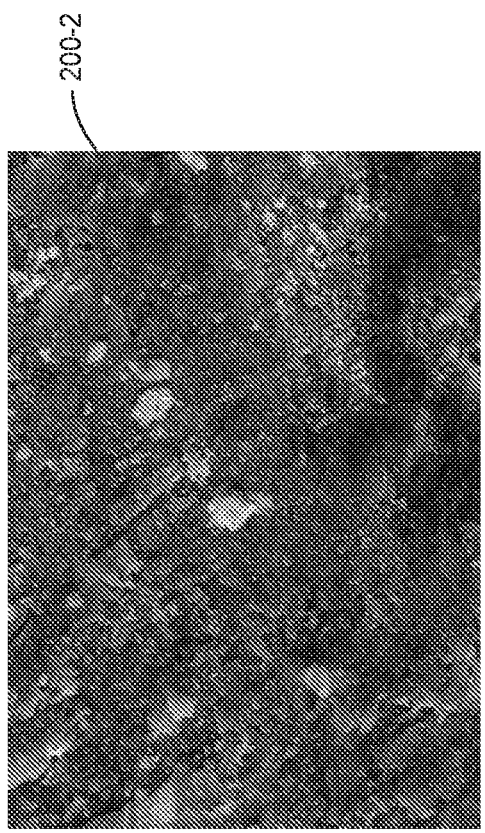
FIG. 2 presents photomicrographs taken by a scanning electron microscope at a magnification of 400× in plan view of boards of as-received commercial refractory thermal insulation that are suitable among others individually and/or in combination for use in the construction of the refractory thermal insulation assemblies lining the interior walls of thermally insulated first housing herein.
Figure 2B:
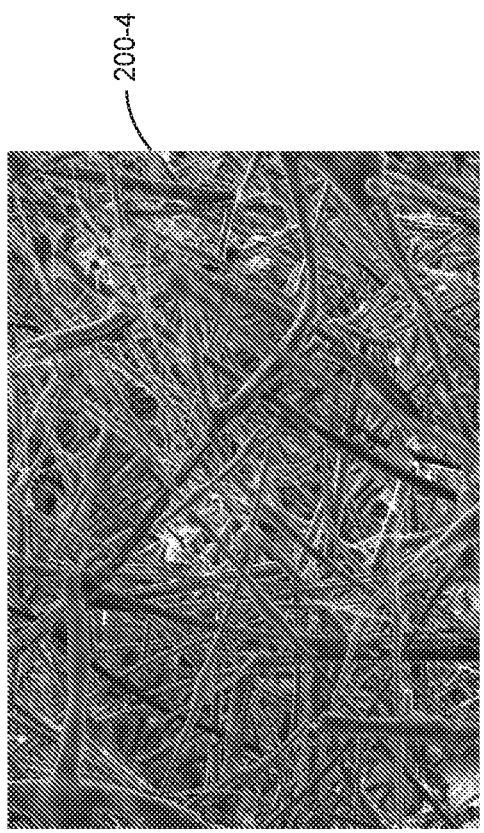
Figure 2C:
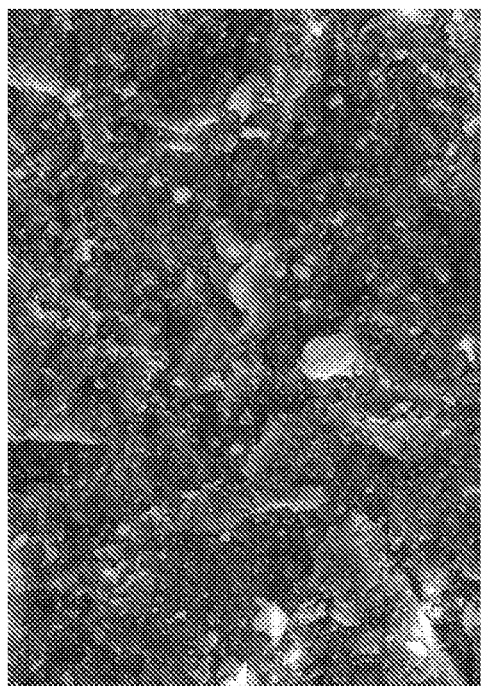
Figure 2D:
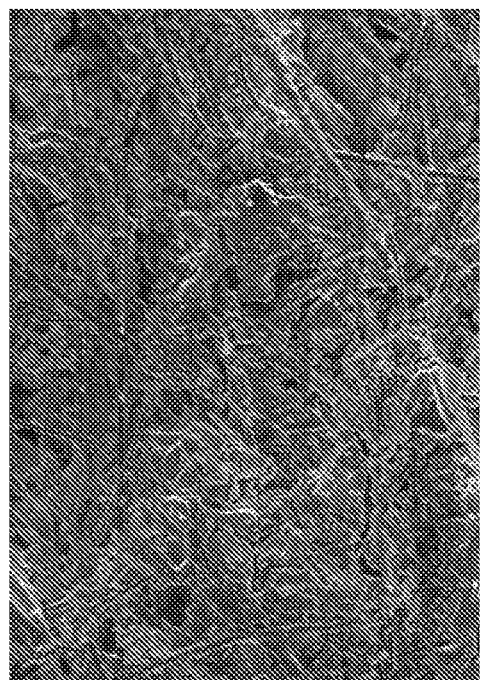
Figure 3A:
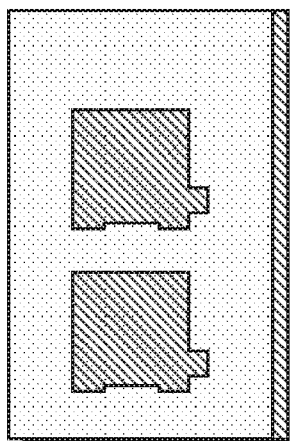
FIG. 3 illustrates several embodiments of precisely dimensioned and configured refractory thermal insulation sections cut from boards of this material such as any of those shown in FIG. 2.
Figure 3B:
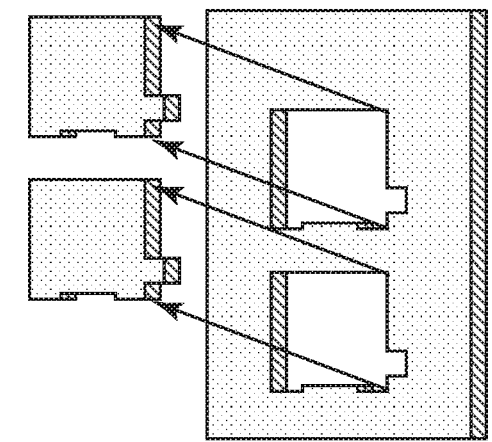
Figure 3C:
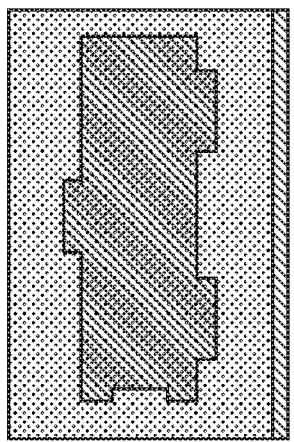
Figure 3D:
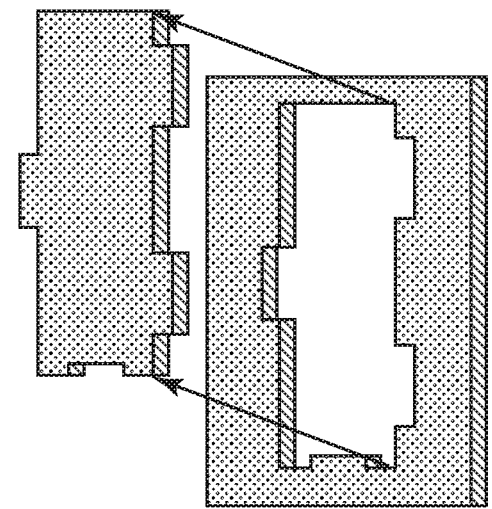
Figure 3E:
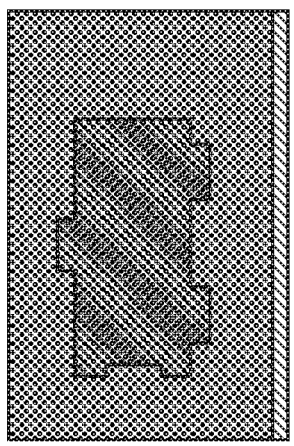
Figure 3F:
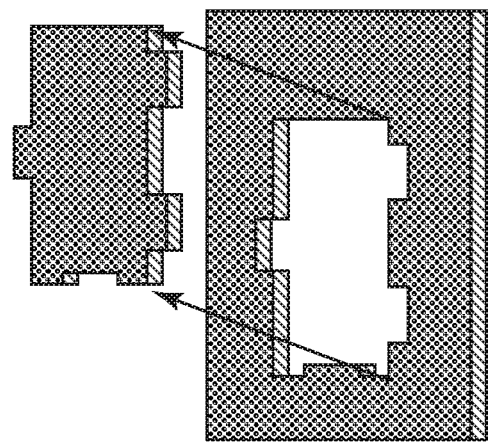

As shown in FIGS. 1A, 1C, 1D and 1E, hot afterburner hot exhaust gas cowl 500 includes front and rear sides 503 and 504, respectively, lateral sides 505 and 506, respectively, and upper side 507a opposing base plate 507b, respectively. Gas flow deflection plates 501 and 502, e.g., fabricated from sheet metal, are fastened to sides 505 and 506 of exhaust gas cowl 500 by fasteners 513 which include spacer elements 514 providing afterburner exhaust gas flow passages 516 and 517, respectively (as shown in FIGS. 1D and 1E). Exhaust gas cowl 500 is affixed to first housing 100 by fasteners, e.g., rivets or welds positioned at their extension members 510a and 510b, respectively, extending from base plate 507b.

As shown in FIGS. 1D and 1E, upper side 507a of exhaust cowl 500 includes hot afterburner exhaust gas slot 508 defined on base plate 507b, multiple louvered exhaust gas vents 523 disposed on upper side 507a of exhaust cowl 500 with lateral sides 505 and 506 thereof featuring multiple similarly configured louvered afterburner exhaust gas vents 522b. Angled deflection baffles 522 attached to base plate 507b, e.g., by rivets or welds, deflect hot afterburner exhaust gas flows discharged through exhaust gas slot 508. The flow paths of the deflected afterburner exhaust gas discharged through afterburner exhaust gas slot 508 and louvered exhaust gas vents 523 are deflected by afterburner exhaust gas baffles 522 as shown in FIGS. 1D and 1E by the broken lines and arrowheads.

Thermally insulated integrated reformer-SOFC stack system 400 with hot afterburner exhaust gas cowl 500 with its aforedescribed arrangement of afterburner exhaust gas slot 508, louvered vents 523, baffles 522 and gas deflection plates 501 and 502 are provided in order to minimize internal gas flow biases that tend to be caused by system dilution fan 211 through an undesired Bernoulli effect. The Bernoulli effect occurs when the higher velocity dilution air passes perpendicularly across the SOFC hot afterburner louvered vents 522a, 522b, 523. This causes the internal pressure of system 400 to decrease; resulting in an increased velocity of reactant flows within the integrated reformer-SOFC system 400 and afterburner 400c. The aforementioned internal gas flow biases are induced within system 400 due to the pitch of the system dilution air, which, driven by system dilution fan 211, flows across system 400 at some non-specific angle. This angled flow results in a lower pressure and/or higher reactant velocity on one side of system 400 compared to the other. The internal gas flow biases can cause system 400 to operate under undesirable conditions since the residence time of reactant flows is shorter in that portion of the SOFC section with the lower pressure. Such gas flow biases may lead to irreversible damage to system 400 due to over-utilization of individual SOFC reactor units within the whole of the SOFC section. Such over-utilization of individual SOFC reactor units is a known degradation operating mode, leading to potential structural failure of SOFC bodies. Exhaust gas cowl 500 does much to mitigate such gas flow biases by creating an open chamber 511 outside of afterburner unit 400c enabling the hot afterburner exhaust gases to cool and contract before being mixed with system dilution air. Such open chamber 511 functions to increase the length of the hot afterburner exhaust gas flow paths thereby creating a buffering zone 512. Buffering zone 512 functions to limit backward pressure communication, thereby helping to maintain uniform reactant flows and/or operating pressures throughout system 400 whereby the potential for creating over-utilization operating conditions is prevented or lessened. Angled baffles 522 disposed upon base plate 507b within exhaust cowl 500 spread the hot afterburner exhaust gases therein. This deflection of hot afterburner exhaust gas aids in achieving heat transfer from such exhaust gas to the surrounding system cool dilution air through the exhaust cowl body. It is important for the exhaust gas to cool as much as possible before mixing with the system dilution air because of the volume change that occurs during such cooling. Were the exhaust gas to mix at its exiting temperature from afterburner 400c with the system dilution air (which is approximately at room temperature), the resulting rapid cooling can lead to a rapid volume change in the exhaust gas; causing a rapid pressure change in system 400 as well. Cooling the exhaust gas via exhaust gas cowl 500, prior to mixing with system dilution air mitigates any rapid pressure change. The exhaust gas cowl is also constructed with two gas flow deflection plates 501 and 502 that aid in funneling the system dilution air in and across the top surface of exhaust cowl 500. Deflection plates 501 and 502 also function as heat transfer fins to more efficiently cool exhaust cowl 500, and therefore the afterburner exhaust gases present therein. The cooled exhaust gas then exit exhaust cowl 500 through multiple louvered vents 522a and 522b disposed on outside surfaces 505 and 506 of exhaust cowl 500, where it mixes with the system dilution air at a similar temperature.

FIGS. 2A-2D present microphotographs showing the interlocked engagement of refractory fibers and refractory particulates characteristic of four specific types of refractory thermal insulation sheets, or boards, that are useful, among others, for constructing the thermal insulation assemblies herein.

Details of these four particular types of refractory thermal insulation are as follows:

Thermal Insulation Sheet Types:

Thermal Insulation Type 1 Tradename: Thinsheet 1000R Supplier: Promat Inc. (270a of FIG. 2A)

High-purity, high temperature-rated (peak temperature rating of 1000° C.) microporous insulation board; a blend of filament-reinforced pyrogenic silica with a thickness of 3 mm+/−0.5 mm and having a length and width that are "end-use dependent".

Thermal Insulation Type 2 Tradename: Thinsheet 1200A Supplier: Promat Inc. (270b of FIG. 2B)

97% high-purity alumina insulation board, peak operating temperature of 1200° C. (thickness of 3 mm/+−0.5 mm (greater than 98 wt. % alumina and less than 2 wt. % silica) length and width are end-use dependent.

Thermal Insulation Type 3 Tradename: T-Cast AA45 Suppier: Unifrax (270c of FIG. 2C)

High-purity alumina insulation board (greater than 98 wt. % Alumina, less than 2 wt. % Silica) having a peak usage 1650 C, a thickness of 5 mm+−'0.5 mm; length and width are end-use dependent.

Thermal Insulation Type 4 Tradename: RS-3000 Felt Supplier: ZIRCAR Refractory Composites, Inc. (270d of FIG. 2D)

97 wt. % high-purity alumina fiber (less than 3 wt. % silica) with less than 1 wt % trace elements. The ceramic felt is a strong, flexible material with fibers held together with an organic binder, temperature rating of 1650° C. as-received thicknesses of 3 mm (⅛ inches) and 1 mm (1/32 inches).

Referring now to FIGS. 3A-3H, there is schematically shown in shallow perspective view the cutting out of individual thermal insulation sections of specific dimensions and configuration 300 from boards of one or more of the four thermal insulation types 270a-270d described in FIGS. 2A-2D. Any conventional or otherwise known cutting apparatus can be used to produce these precisely cut and configured sections. For example, cutting can be accomplished employing die cutting or water jet cutting apparatus. However, it is preferred that the thermal insulation sections be cut from a thermal insulation board by means of laser cutting equipment such as a Trotec Speedy 300 carbon dioxide laser or other laser cutting apparatus of similar capability. Laser cutting has the advantage of producing very well-defined cut lines and perhaps more importantly, heat-sealing or melt fusion of fibers and particulates along the resulting very clean-cut edge. This in turn allows for highly accurate and precise placement and assembly of the individually cut thermal insulation sections to form a desired insulation assembly configuration. The functions of tabs and slots are explained below in connection with the descriptions of the refractory thermal insulation assembly steps schematically illustrated in FIGS. 4A-4F.

Referring now to the sequence of steps schematically illustrated in FIGS. 4A-4F for assembling one embodiment of a refractory thermal insulation lining to provide thermally insulated first housing in accordance with the teachings of the present invention, a refractory thermal insulation section is adherently applied to the interior surface of one of the four panels comprising a side of thermally insulated first housing of FIG. 1 employing any suitable refractory adhesive or cement various kinds of which are known for this purpose and are commercially available, e.g., Tradename: Resbond 940 Supplier: Cotronics. It is also within the scope of this invention to prepare a refractory adhesive or cement from scraps left over from the cutting out of the thermal insulation sections shown in FIGS. 3A-3H, pulverizing the scraps and combining the resulting powder with a binder, e.g., Polyethylene Glycol (PEG), Polyvinyl Alcohol (PVA), Glycerol, and fluid carrier such as, e.g., ethanol, isopropyl alcohol, or acetone so as to form a spreadable refractory adhesive paste. As recognized by those skilled in the art, the weight proportions of refractory powder, selected binder and selected fluid carrier can vary considerably with their optimum amounts being readily determined by routine experimental testing, e.g., 1:3 wt, PEG:1000R (pulverized). The optimum weight amount of refractory adhesive paste to be utilized to obtain firm adherence of a thermal insulation section to the interior surface of a first or, optionally, second housing panel, e.g., 1 to 5 grams or to an underlying thermal insulation section, e.g., 1 to 5 grams, thereof can also be readily determined by those skilled in the art for a particular thermal insulation assembly employing routine experimental testing.

Figure 4A:
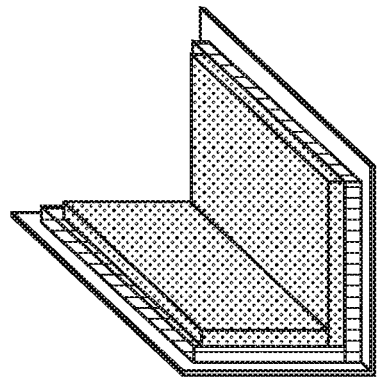
FIGS. 4A-4F illustrate in perspective views one embodiment of a sequence of steps employed in the method of construction of a layered, or laminate, refractory thermal insulation lining assembly adherently attached to the interior surfaces of adjoining wall panels of thermally insulated first housing 100.
Figure 4B:
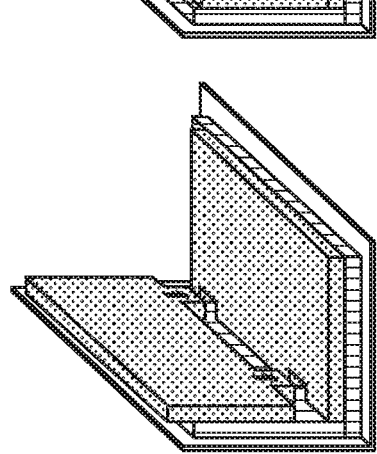
Figure 4C:
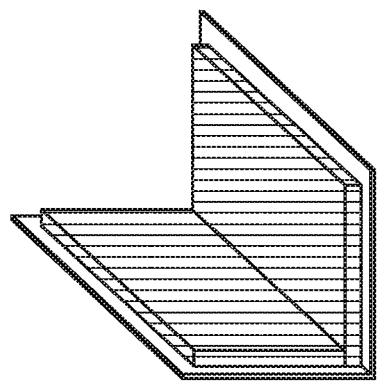
Figure 4D:
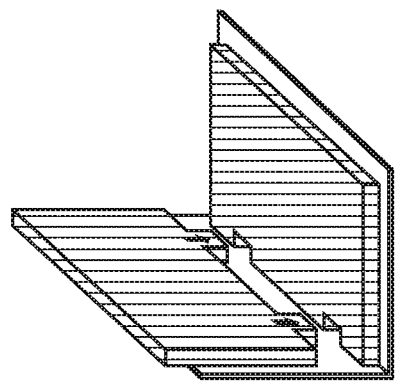
Figure 4E:
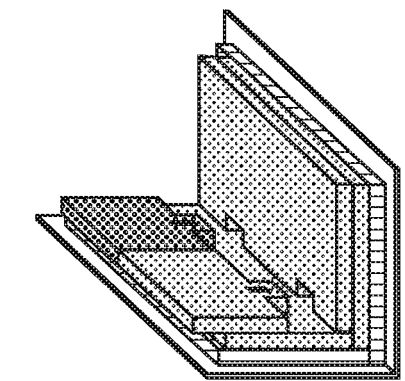
Figure 4F:
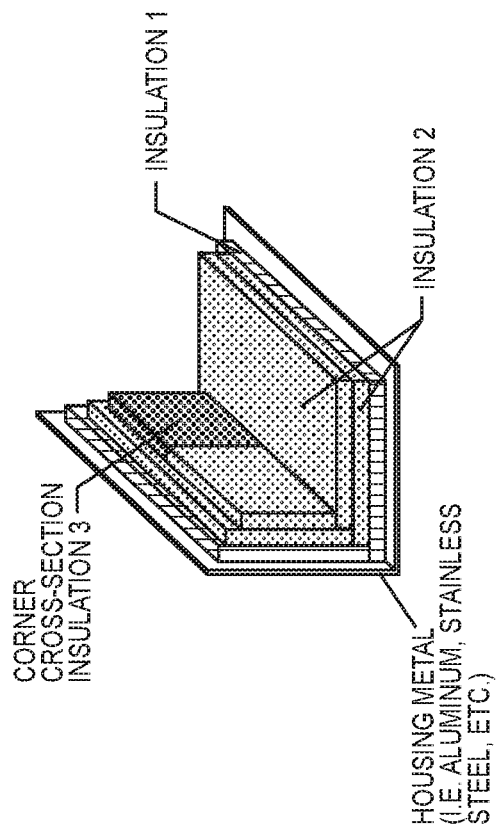
Figure 5C:
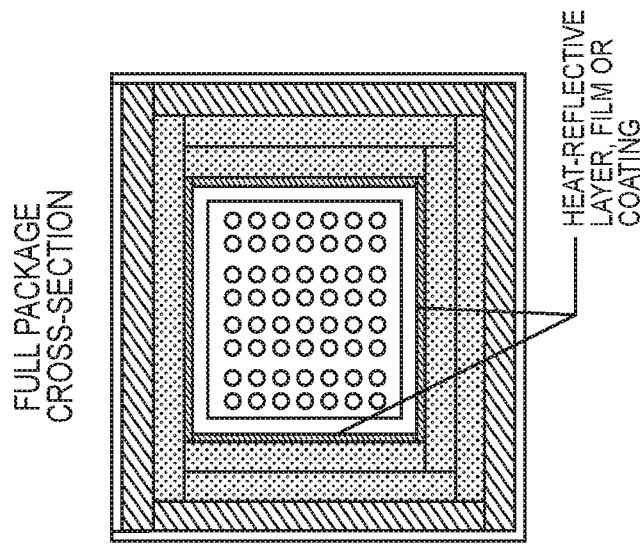
FIG. 5C illustrates a full cross section view of one end of thermally insulated first housing and SOFC unit.
Figure 5B:
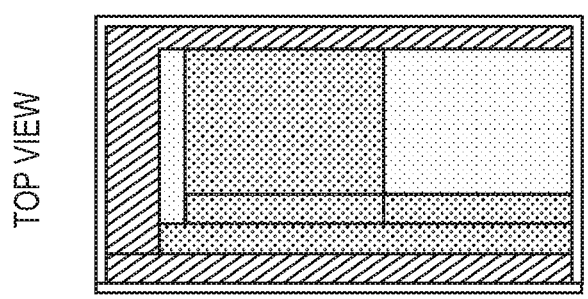
FIGS. 5A and 5B illustrate, respectively, partial cross section end and top plan views of the thermal insulation assembly shown in FIGS. 4E and 4F.
Figure 5A:
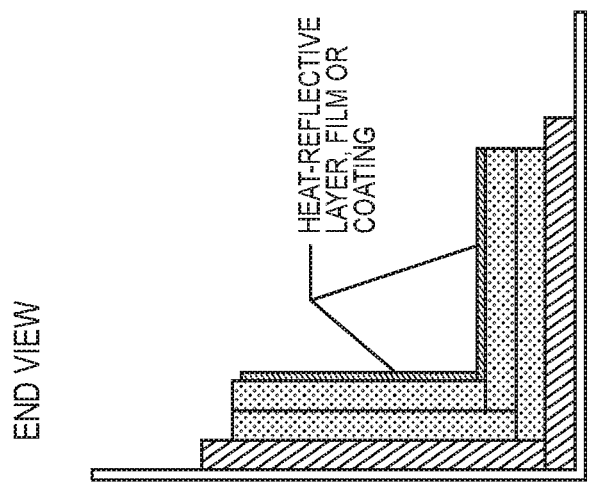

Referring, now to FIG. 4A, thermal insulation section is adherently secured to an interior surface of one of the four side panels of first housing to be thermally insulated. Once section is firmly secured in place, thermal insulation section is adherently applied to the surface of an adjacent interior wall of the first housing, tabs of section thereof fitting precisely into slots of section with the result being illustrated in FIG. 4B, thereby securing the mechanical union of the 2 thermal insulation sections without the need for separate mechanical fasteners. As shown in FIG. 4C, the assembly steps illustrated in FIGS. 7A and 7B are substantially repeated by adherently installing thermal insulation sections to provide the step-wise (viewed on end) arrangement of insulation sections illustrated in FIG. 4D. Following these assembly steps and as illustrated in FIG. 4E, thermal insulation sections are adherently installed to result in the arrangement shown, the cross-section end and top (plan) views of the thermal insulation assembly being illustrated in FIGS. 5A and 5B, respectively, and the full thermal insulation lining of the housing being illustrated in the top plan view shown in FIG. 5C. If it is desired to install a thermal insulation lining in the optional second housing 200 it may be preferable to construct such lining in the same manner as for thermally insulated first housing and as schematically illustrated in FIGS. 4A-4F. However, it may also be preferred to utilize a simpler construction method for this optional thermal insulation lining since achieving a tortuous path configuration as in the case of first thermally insulated housing 100 is typically not an essential consideration.

It is also contemplated that an additional heat reflecting layer may be added to the surface of a insulation assembly or combination of such assemblies facing toward the heat-producing, heat-radiating device possesses at least one-heat reflective coating film or layer such as aluminum or mylar.

Figure 6B:
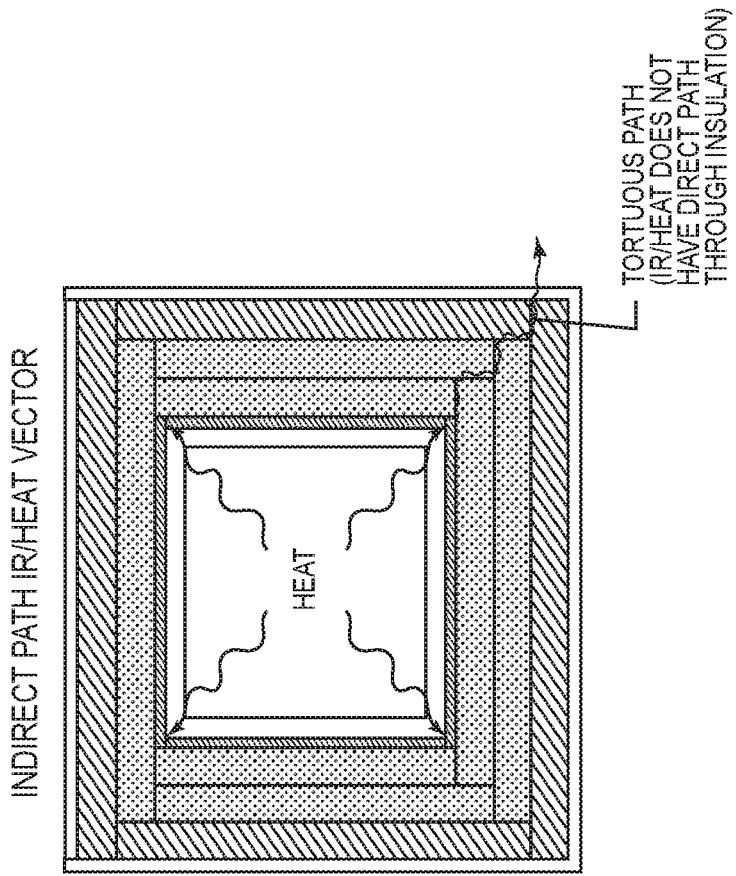
FIG. 6B illustrates in plan view one embodiment of thermally insulated first housing according to the present teachings wherein internal surfaces of housing panels are lined with overlapping, superimposed layers of refractory thermal insulation material such as those shown in FIG. 2, such layers being constructed in step-wise fashion relative to each other in the manner illustrated in FIGS. 7C and 7D whereby paths for the direct flow of IR-radiation are excluded thus better conserving heat produced by the enclosed heat-producing, heat-radiating device and preventing the external surfaces of optional second housing panels from reaching uncomfortable and potentially injurious temperature levels.

FIG. 6 illustrates in top plan view a known type of thermally insulated housing and its enclosed heat-producing, heat-radiating unit. Thermal insulation lining is assembled from thermal insulation boards such as any of those shown in FIG. 2 using simple lap joints to connect the individual thermal insulation sections but without any of the tabs and corresponding slots of the thermal insulation sections utilized in the construction of thermal insulation housing lining shown in top plan view in FIG. 6B. These tabs and their receiving slots serve several important and advantageous functions. For one thing they facilitate accurate placement and precise alignment of thermal insulation sections that are to be joined together along their longitudinal edges. For another, the tabs when fitted to their corresponding slots result in structures where joints between adjacent thermal insulation sections are stronger and more mechanically stable throughout changing temperature regimes reflecting potentially rapid on-off cycling of an enclosed heat-generating, heat-radiating device such as integrated CPOX-SOFC system 400.

Figure 6A:
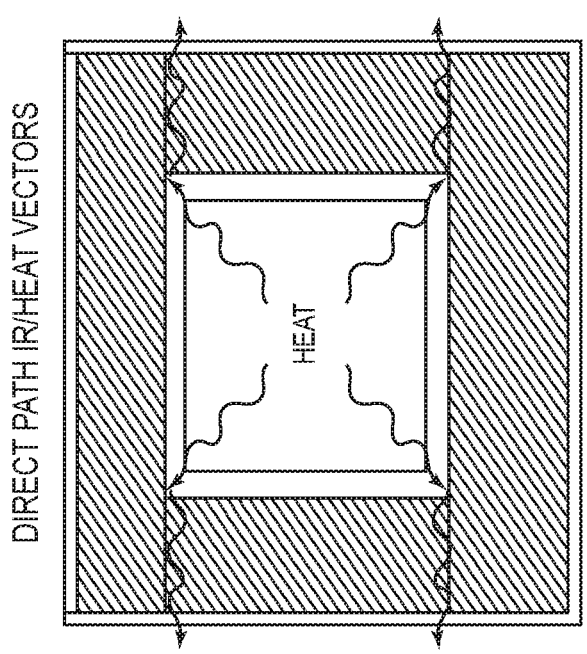
FIG. 6A illustrates in perspective view the construction of a refractory thermal insulation lining in which boards of refractory thermal insulation sections dimensioned and configured in the manner shown in FIGS. 3A-3C and 3D are joined together by simple lap joints in the manner shown thereby presenting direct, in contrast to tortuous, pathways that promote the flow of IR radiation, and therefore heat loss from, and/or excessively high temperatures of external surfaces of optional second housing 200, produced by heat escaping from integrated CPOX-SOFC system 400 of FIGS. 7A-7D.

As shown in FIG. 6, radiant IR vectors are directed to corners formed from abutting ends of thermal insulation sections comprising the thermal insulation lining of the housing. These IR vectors are shown traveling along direct paths formed by abutting ends of thermal insulation assemblies where they impinge upon and pass through wall panels of the housing. Due to these direct paths through thermal insulation lining radiant heat from heat-producing, heat radiating unit is more quickly and readily lost therefrom than from abutting ends of assembled thermal insulation sections shown in FIG. 6B in contrast to the construction of thermal insulation lining of FIG. 6A in which radiant IR vectors must follow a tortuous path before being able to escape housing, the result being a much diminished loss of heat from heat-producing, heat-radiating device.

Representative of the enclosed heat-producing, heat-radiating device herein is thermally insulated integrated gaseous fuel CPOX reformer and SOFC stack 400 of FIG. 7A. As illustrated in FIG. 7A, air as an oxygen-containing gas, typically at ambient temperature, is introduced at a preset mass flow rate via centrifugal blower system 402 through inlet 403 of conduit 404. Propane gas is introduced into conduit 404 via fuel line 441 and fuel inlet 442. The propane and air begin to combine in mixing zone 420 of conduit 404 to provide a gaseous CPOX reaction mixture. A mixer of any suitable kind, for example, a static mixer disposed within mixing zone 420 and/or a helically-grooved internal wall surface of conduit 404, can be included to provide a gaseous CPOX reaction mixture of greater compositional uniformity than otherwise would form in mixing zone 420.

Following its passage through the optional static mixer and/or contact with helical grooves disposed within mixing zone 420, gaseous CPOX reaction mixture exits conduit 404 through outlet 425 and enters gas distributor 427 of manifold 426 which is configured to provide a more uniform distribution of the reaction mixture to, and within, tubular CPOX reactor units 408. Such an arrangement or other arrangement within the present teachings can provide a distribution of gaseous CPOX reaction mixture where the difference in flow rate of the gaseous CPOX reaction mixture within any two CPOX reactor units is not greater than about 20 percent, for example, not greater than about 10 percent or not greater than about 5 percent.

Returning to FIG. 7A, manifold 426 together with associated tubular CPOX reactor units 408) includes manifold housing, or enclosure, 428 defining manifold chamber 429 within which gaseous CPOX reaction mixture (gas) distributor 427 is connected to outlet 425 of conduit 404. Gaseous CPOX reaction mixture exiting conduit 404 through outlet 425 enters gas distributor 427 thereafter passing outwardly through apertures (e.g., holes or slots) 430 located at the bottom or lower part of the gas distributor, the gas then flowing around the exterior surface of the distributor to its top or upper part and from there into inlets 431 of tubular CPOX reactor units 408. The path of the gaseous CPOX reaction mixture as it passes through apertures 430 and into inlets 431 is shown in FIG. 7B.

Some specific factors that can bear upon the optimization of the design of manifold 426 for accomplishing its function of promoting a more uniform distribution of gaseous CPOX reaction mixture to CPOX reactor units include the configuration of its housing 428, the volume of its chamber 429, and the dimensions of gas distributor 427 including the number, design and placement of its apertures 430. Such factors in turn depend on such reformer design and operational factors as the target flow rates of gaseous CPOX reaction mixture within a conduit, the number and arrangement of CPOX reactor units 408, the shape and dimensions of inlets 431 of CPOX reactor units 408, and similar considerations. A manifold of optimal fuel-air distribution performance for a particular gaseous fuel CPOX reformer in accordance with the present teachings can be readily constructed by those skilled in the art employing routine testing methods.

Where a CPOX reaction zone of a CPOX reactor unit is substantially coextensive with the length of the reactor unit, manifold housing 428 can be fabricated from a material that remains thermally and mechanically stable at the high temperatures that are typical of CPOX reforming. In these embodiments, various kinds of refractory materials, including refractory composites such as carbon fiber- and/or glass fiber-reinforced ceramics, are suitable for fabricating the manifold housing. Suitable materials of construction include dense ceramics such as various known types of alumina, recrystallized alumina, alumino-silicates, boron nitride, glass-ceramics, magnesium oxide, zirconium phosphate, and the like, metals such as nickel-chromium-based super alloys, Hastelloy super alloys, and the like. However, these and other refractory materials tend to be relatively high in cost and can also be challenging to work with, especially in the case of manufacturing articles with relatively complex configurations.

As shown in an enlarged, exemplary longitudinal cross section view of CPOX reactor unit 408 illustrated in FIG. 7F, gas-permeable wall 451 of CPOX reactor units 408 can be divided along its length into a first, or upstream, region 452, starting at its fuel-air mixture inlet 431, that is substantially devoid of CPOX catalyst, and a second, or downstream, region 453, starting at the end of first region 452 and ending at or proximate to product reformate effluent outlet 454 of the reactor unit, that contains a catalytically effective amount of CPOX catalyst 464. During steady-state operation of CPOX reformer 400 of FIG. 7A, this embodiment of CPOX reactor unit 408 largely confines hot CPOX reaction zones 409 to their second regions 453 leaving their essentially CPOX catalyst-free first regions 452 to remain at a considerably lower temperature, for example, in the region of from ambient up to about 350° C., particularly at the juncture of fuel-air mixture inlets 431 of CPOX reactor units 408 and manifold housing 428.

The lower temperature of a CPOX catalyst-free wall section zone, which temperature is lower than the melting temperature of many thermoplastic resins and below the thermal degradation temperature of many thermoset resins, makes it practical and advantageous to utilize any of several families of thermoplastic and thermoset resins for the manufacture of manifold housing 428. Specific types of thermoplastic and thermoset resins that can be used for the fabrication of a manifold housing include polyetherimide (PEI), polyaryletherketones (PAEKs) such as polyether ether ketone (PEEK), phenol-formaldehyde resins, and the like. These and other thermally stable resins, in addition to their relatively low material cost, have the added advantage of being readily formable into complex shapes employing low cost manufacturing procedures.

Returning to FIG. 7A, from manifold 426, gaseous CPOX reaction mixture enters inlets 431 of CPOX reactor units 408 and into CPOX reaction zones 409 where the reaction mixture undergoes a gaseous phase CPOX reaction to produce a hydrogen-rich, carbon monoxide-containing reformate. In the start-up mode, one or more igniters 435 initiates CPOX. After CPOX becomes self-sustaining, for example, when the temperature of the reaction zone reaches from about 250° C. to about 1100° C., the igniter(s) can be shut off as external ignition is no longer required to maintain the now self-sustaining CPOX reaction. Thermal insulation 410, for example, of the microporous or alumina-based refractory type, surrounds those portions of the CPOX reformer to reduce thermal losses from these components.

Figure 7C:
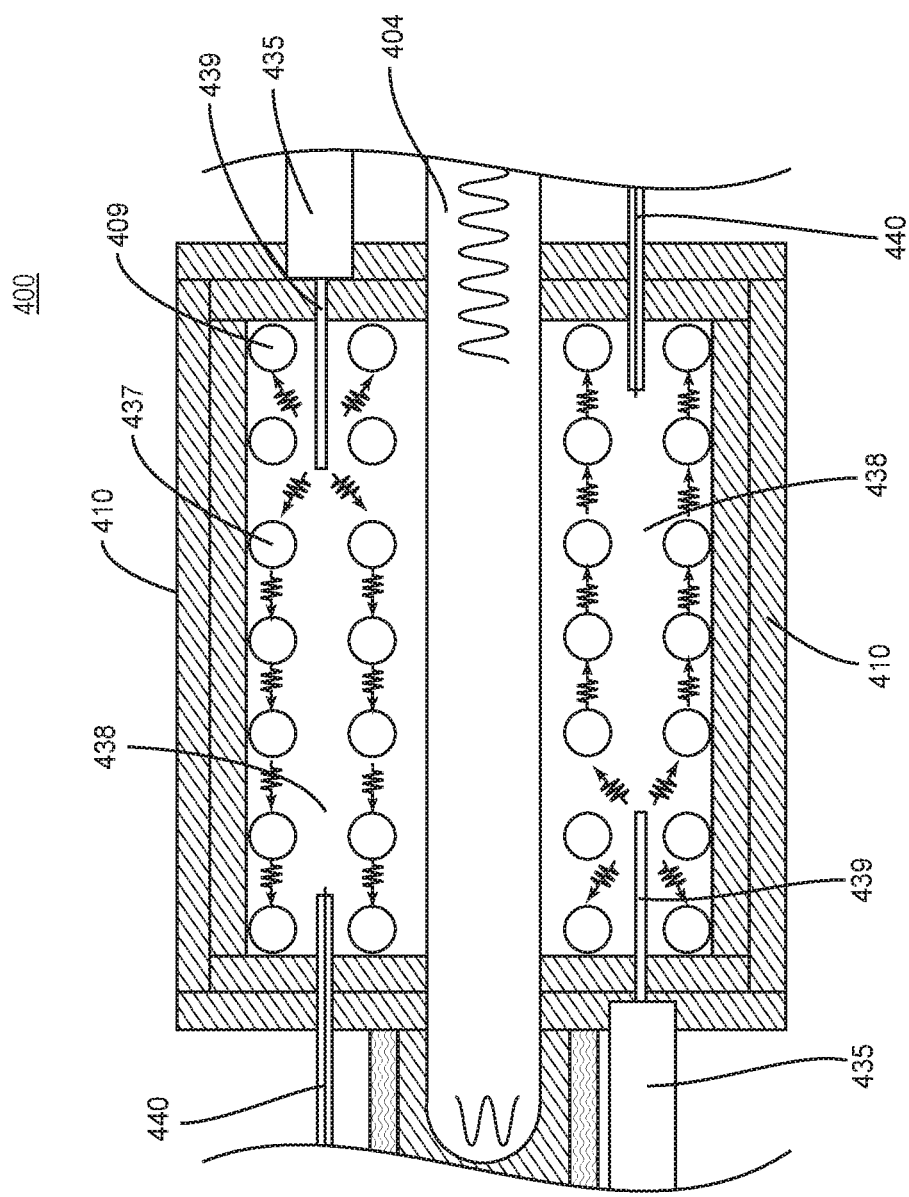
FIG. 7C is a plan cross section view of a portion of the gaseous fuel CPOX reformer section of the integrated liquid fuel CPOX reformer-fuel cell system illustrated in FIG. 7A.
Figure 7D:
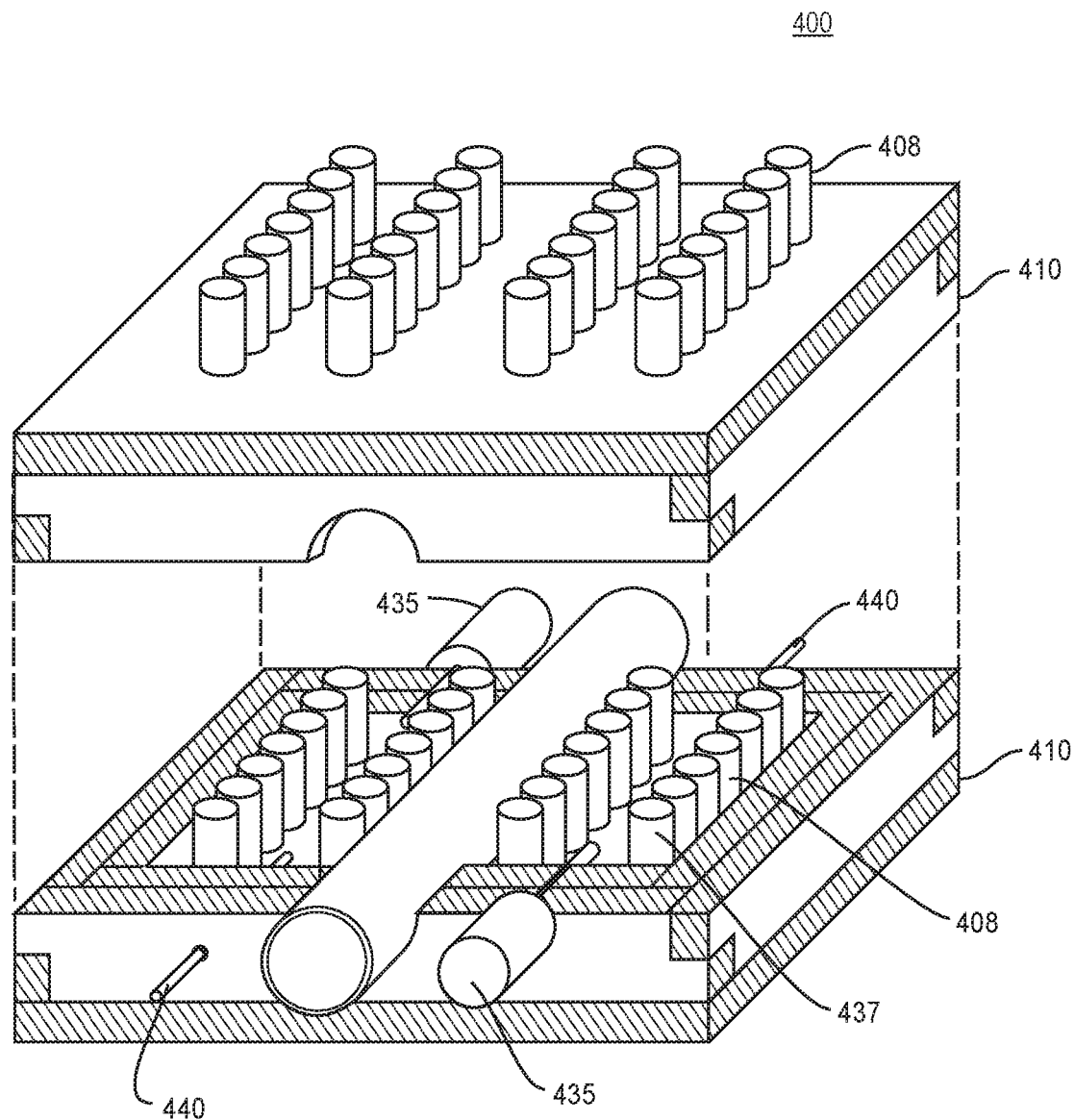
FIG. 7D is an enlarged perspective, exploded view of the thermally insulated, exothermic heat-retention chamber, igniters and CPOX reaction zones of the tubular CPOX reactor tubes of the integrated gaseous fuel CPOX reformer-SOFC system illustrated in FIG. 7A.

FIGS. 7A-7D illustrate an embodiment of the present teachings where two igniters 435 (one for each array) are used to initiate a CPOX reaction within CPOX reaction zones 409 of CPOX reactor units 408 in chamber 436 during the start-up mode of operation of reformer 400. As shown in FIGS. 7C and 7D, CPOX reactor units 408 are arranged in two separate 2×7 parallel arrays with each array being disposed within chamber 436, one such array flanking one side of conduit 404 and the other such array flanking the other side of conduit 404. The perimeter of an array marks the boundary between open space 438 of chamber 436 and thermal insulation 410. Exterior surfaces 437 of the walls of CPOX reactor units 408 corresponding to at least a portion of their CPOX reaction zones 409 are exposed within open space 438. If a hydrogen barrier is present, the hydrogen barrier can be the exposed, exterior surface of a CPOX reactor unit. Igniters 435 of the electrical resistance type, for example, rated at from 10 to 80 watts or greater, are disposed at opposite ends of chamber 436 where their radiant heat-producing elements 439 are positioned in proximity to, but in physical isolation from, exterior surfaces 437 of CPOX reactor units 408. Thermocouples 440 are disposed at the ends of chamber 436 opposite igniters 435 in order to monitor the temperature of CPOX reaction zones 409 and provide a reformer control input as described in connection with control system 300 illustrated in FIG. 3A. Operation of the igniters causes radiant heat to be transferred to, and through, the walls of one or more nearby CPOX reactor units whereby CPOX is initiated within the CPOX reaction zone of such reactor unit(s). The thermal radiation emitted from the CPOX reaction zone(s) of these nearby CPOX reactor units can then initiate CPOX within the reaction zones of the remaining CPOX reactor units within the array as illustrated by the wavy arrows in FIG. 7C.

The provision of a single, or at most a few, igniter(s) that avoid direct contact with CPOX reactor units 408 provides several advantages over a CPOX igniter system in which each CPOX reactor unit has its own physically attached or integrated igniter. While use of the latter ignition system is contemplated by the present teachings, identification of an inoperative igniter can be problematic and its removal and replacement without damage to the CPOX reactor unit of which it is a part and/or disturbance to other reactor units in the array can be difficult. Accordingly, a single or just a few igniters appropriately positioned within an array or plurality of CPOX reactor units can permit easy and simple identification and extraction from CPOX reformer 400 of a failed or defective igniter, and its replacement with an operative igniter.

As shown in FIGS. 7C and 7D where two igniters are used to initiate the CPOX reaction within CPOX reaction zones 409 of CPOX reactor units 408, it can be advantageous to reverse the positions of igniter 435 and thermocouple 440 on one side of chamber 436 relative to the positions of igniter 435 and thermocouple 440 on the other side of the chamber, particularly where there can be significant thermal communication between the two chambers. Such an arrangement has been observed to result in a more rapid initiation of CPOX within the CPOX reaction zones of each separate array of CPOX reactor units. However, it should be understood that with appropriately dimensioned and positioned CPOX reactor units within a chamber, a single igniter can be used to initiate CPOX within the CPOX reaction zones of the CPOX reactor units within the chamber.

Those skilled in the art, taking into account the various embodiments of the integrated liquid fuel CPOX reformers-fuel cell systems described herein and the principles of operation of the same, by employing routine experimental procedures can readily optimize the design of a particular integrated CPOX reformer-fuel cell system of desired liquid reformable fuel conversion and electrical power output capacities, structural characteristics, and mechanical properties in accordance with the present teachings.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

The invention claimed is:

1. A thermally insulated housing for enclosing a heat producing, heat-radiating device, comprising:
a first housing possessing conjoined side, top and bottom panels such panels having opposed internal and exposed external sides, the panels being dimensioned and configured to completely enclose a heat-producing, heat-radiating device, the internal sides of the first housing panels having adherently attached thereto at least one refractory thermal insulation assembly or combination of such assemblies, each thermal insulation assembly or combination of thermal insulation assemblies defining at least one structure made up of superimposed layers of predimensioned and preconfigured refractory thermal insulation sections with one side of a thermal insulation assembly or combination of such assemblies being adherently attached to the internal side of each first housing panel and an opposing side of a thermal insulation assembly or combination of such assemblies facing toward the heat-producing, heat-radiating device, the dimensions, configuration and a maximum service temperature of each thermal insulation assembly or combination of such assemblies being such as to substantially completely and continuously line the internal surfaces of all panels of the first housing thereby inhibiting thermal losses from the enclosed heat-producing, heat-radiating device to a predetermined extent, each thermal insulation assembly, being provided such that at least two of the thermal insulation sections are conjoined thermal insulation sections which are present in a step-wise relation to each other when viewed on an end, and which step-wise relation excludes a direct path for the flow of IR radiation from the heat-producing, heat-radiating device while maintaining a cool to the touch surface temperature on the external surface of each first housing panel.

2. The thermally insulated housing of claim 1 wherein a thermal insulation section of the thermal insulation sections possesses one or more tabs disposed at intervals along a lengthwise edge for locking engagement with corresponding slots disposed along a lengthwise edge of another thermal insulation section of the thermal insulation sections.

3. The thermally insulated housing of claim 1 wherein each thermal insulation panel is laser cut.

4. The thermally insulated housing of claim 1 wherein the insulation is a continuous lining of superimposed thermal insulation sections.

5. The thermally insulated housing of claim 1 wherein the insulation is a lining comprising a plurality of thermal insulation assemblies in end-to-end abutting relation to each other.

6. The thermally insulated first housing of claim 1 wherein the enclosed heat-producing, heat-radiating device is a reformer having its reformate discharge end connected to the hydrogen-containing reformate-receiving end of a fuel cell, spent gas from the fuel cell being in gas flow communication with an afterburner section, the spent gas undergoing combustion therein with the resulting hot combustion gases being discharged therefrom.

7. The thermally insulated first housing of claim 6 wherein hot afterburner combustion gas flows are modified by contact with gas flow redirecting elements.

8. The thermally insulated first housing of claim 7 wherein the gas flow redirecting elements comprise an exhaust cowl for enclosing and redirecting flows of hot afterburner combustion gases as they are discharged from the afterburner through one or more afterburner combustion gas slots in gas flow communication with the exhaust cowl.

9. The thermally insulated first housing of claim 8 wherein the gas flow redirecting elements comprise louvered exhaust gas vents defined upon the top and lateral sides of the exhaust cowl.

10. The thermally insulated first housing of claim 9 wherein gas flows discharged through louvered exhaust gas vents disposed on the lateral sides of the exhaust cowl are redirected to a gas flow passage defined by exhaust gas flow redirecting plates fastened to the lateral sides of the exhaust cowl.

11. The thermally insulated first housing of claim 6 wherein the enclosed heat producing heat radiating device is a steam, autothermal or multi-tubular CPOX reformer having its reformate discharge end connected to the reformate receiving end of a multi-tubular SOFC.

12. The thermally insulated first housing of claim 1 substantially fully enclosed within a second housing.

13. The thermally insulated first housing of claim 11 wherein the second housing comprises conjoined side, top and bottom panels possessing internal and exposed external sides, the second housing being internally separated by a firewall into a hot zone and a cool zone, the hot zone being of sufficient volume to substantially fully enclose the first housing.

14. The thermally insulated first housing of claim 1 enclosed within a thermally insulated second housing.

15. The thermally insulated housing of claim 1 wherein a thermal insulation assembly comprises at least one refractory thermal insulation sheet selected from the group consisting of Thinsheet 1000R, Thinsheet 1200A, T-Cast AA45 and RS-3000.

16. The thermally insulated housing of claim 15 wherein each thermal insulation sheet comprising a thermal insulation assembly is laser cut to predetermined length and width dimensions.

17. The thermally insulated housing of claim 1 wherein in a thermal insulation assembly made up of superimposed layers of refractory insulation layers the edge of a thermal insulation panel possesses at least one tab that aligns and mates in close-fitting relationship with a corresponding slot defined upon or within an underlying thermal insulation panel.

18. The thermally insulated housing of claim 1 wherein the side of an insulation assembly or combination of such assemblies facing toward the heat-producing, heat-radiating device has attached thereto at least one heat reflective coating, film or layer selected from the group consisting of aluminum and mylar.

19. The thermally insulated housing of claim 1, wherein the side of the thermal insulation assembly or combination of such assemblies facing toward the heat producing device is spatially separated therefrom.

20. A thermally insulated housing for enclosing a heat producing, heat-radiating device, comprising: a first housing (110) possessing conjoined side, top and bottom panels such panels having opposed internal and exposed external sides, the panels being dimensioned and configured to completely enclose a heat-producing, heat-radiating device, the internal sides of the first housing panels having adherently attached thereto at least one refractory thermal insulation assembly or combination of such assemblies, each thermal insulation assembly or combination of thermal insulation assemblies defining at least one structure made up of superimposed layers of predimensioned and preconfigured refractory thermal insulation sections with a major side of a thermal insulation assembly or combination of such assemblies facing toward the heat-producing, heat-radiating device, the dimensions, configuration and maximum service temperature of each thermal insulation assembly or combination of such assemblies being such as to substantially completely and continuously line the internal sides of all panels of the first housing (110) thereby inhibiting thermal losses from the enclosed heat-producing, heat-radiating device to a predetermined extent, each thermal insulation assembly, excluding a direct path for the flow of IR radiation from the heat-producing, heat-radiating device while maintaining a maximum predetermined surface temperature on the external surface of each first housing panel.

* * * * *